United States Patent
Lomet

(10) Patent No.: US 6,578,041 B1
(45) Date of Patent: Jun. 10, 2003

(54) HIGH SPEED ON-LINE BACKUP WHEN USING LOGICAL LOG OPERATIONS

(75) Inventor: David B. Lomet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 358 days.

(21) Appl. No.: 09/607,614

(22) Filed: Jun. 30, 2000

(51) Int. Cl.[7] .................................................. G06F 7/00

(52) U.S. Cl. ........................ 707/102; 707/202; 707/201; 709/219

(58) Field of Search ............................ 707/102, 3, 10, 707/201, 202, 200, 1, 2, 9, 103 R, 104.1, 203, 204, 205; 328/162; 709/219; 714/4

(56) References Cited

U.S. PATENT DOCUMENTS

| | | | | |
|---|---|---|---|---|
| 5,727,204 A | * | 3/1998 | Greene, VII | 707/102 |
| 5,758,337 A | * | 5/1998 | Hammond | 707/3 |
| 5,799,323 A | * | 8/1998 | Mosher et al. | 707/10 |
| 5,864,849 A | * | 1/1999 | Bohannon et al. | 707/201 |
| 5,884,328 A | * | 3/1999 | Mosher, Jr. | 707/202 |
| 5,912,994 A | * | 6/1999 | Norton et al. | 382/162 |
| 5,963,961 A | * | 10/1999 | Cannon et al. | 707/200 |
| 6,044,367 A | * | 3/2000 | Wolff | 707/1 |
| 6,144,999 A | * | 11/2000 | Khalidi et al. | 709/219 |
| 6,163,856 A | * | 12/2000 | Dion et al. | 714/4 |
| 6,182,086 B1 | * | 1/2001 | Lomet et al. | 707/202 |

OTHER PUBLICATIONS

Lomet, D. et al., "Exploiting A History Database For Backup," Proceedings of the 19th VLDB Conference, Dublin, Ireland, 1993, 380–390.

Mohan, C., et al. "An Efficient and Flexible Method for Archiving a Data Base," SIGMOD, 5/93, Washington, D.C., 139–146.

Bernstein, P., et al., "Recovery Algorithms for Database Systems," *IFIP World Computer Congress*, (Sep. 83), 799–807.

Bernstein, P., et al., "*Concurrency Control and Recovery in Database Systems,*" Addison Wesley Publishing Company (1987).

Crus, R., "Data Recovery in IBM Database 2," *IBM Systems Journal*, 23,2 (1984), 178–188.

Gray, J., et al. "The Recovery Manager of the System R Database Manager," *Computing Surveys*, 13,2 (Jun. 1981), 223–242.

Gray, J., et al., "*Transaction Processing: Concepts and Techniques,*" Morgan Kaufmann Publishers, Inc. (1993) San Mateo, CA.

Haerder, T., et al. "Principles of Transaction–Oriented Database Recovery," *Computing Surveys*, 15,4 (Dec. 1983), 287–317.

(List continued on next page.)

*Primary Examiner*—Charles Rones
*Assistant Examiner*—Hassan Mahmoudi
(74) *Attorney, Agent, or Firm*—Woodcock Washburn LLP

(57) ABSTRACT

A database computer system and a high speed method for backup is provided for use when general logical operations are logged. Data is copied from the active stable database to a backup database while update activity continues. The stable database is divided into disjoint partitions, and backup progress is independently tracked in each partition. For each partition in which backup progress is to be tracked independently, two boundary values are maintained that separate objects into categories of pending, backed up, or in doubt. To permit backup to proceed with little synchronization between it and the cache manager, backup reports its progress only from time to time. Depending on system tuning considerations, the reporting can be made more or less precise by varying the granularity of the steps in which backup progress is reported.

28 Claims, 9 Drawing Sheets

OTHER PUBLICATIONS

King, R.P., et al. "Management of a Remote Backup Copy for Disaster Recovery," *ACM Trans. on Database Systems*, 16,2 (Jun. 1991), 338–368.

Kumar, V., et al. (eds.) *Recovery Mechanisms in Database Systems*, Prentice Hall PTR, NJ 1998.

Lomet, D., "Persistent Applications Using Generalized Redo Recovery," *Int'l. Conf. on Data Engineering*, Orlando, FL (Feb., 1998).

Lomet, D., et al., "Redo Recovery After System Crashes," *VLDB Conference*, Zurich, Switzerland (1995), 457–468.

Lomet, D. "Advanced Recovery Techniques in Practice," Chapter 25, 697–710.

Lomet, D., et al., "Logical Logging to Extend Recovery to New Domains," ACM SIGMOD Conference, Philadelphia, PA (1999) 73–84.

Mohan, C., et al., "ARIES: A Transaction Recovery Method Supporting Fine–Granularity Locking and Partial Rollbacks Using Write–ahead Logging," *ACM Trans. On Database Systems*, 17,1 (Mar. 1992) 94–162.

Strom, R., et al., "Optimistic Recovery in Distributed Systems," *ACM Trans. On Computer Systems*, 3,3 (Aug. 1985), 204–226.

\* cited by examiner

HIGH SPEED ON-LINE BACKUP WHEN USING LOGICAL LOG OPERATIONS

TECHNICAL FIELD

This invention relates to database computer systems and applications that execute on them. More particularly, this invention relates to methods for backing up a database so that the data therein is recoverable from media failures.

BACKGROUND OF THE INVENTION

Computer systems occasionally crash. A "system crash" is an event in which the computer quits operating the way it is supposed to operate. Common causes of system crashes include power outage, application operating error, and other unknown and often unexplained malfunctions that tend to plague even the best-devised systems and applications. System crashes are unpredictable, and hence, essentially impossible to anticipate and prevent.

A system crash is at the very least annoying, and may result in serious or irreparable damage. For standalone computers or client workstations, a local system crash typically results in loss of work product since the last save interval. The user is inconvenienced by having to reboot the computer and redo the lost work. For servers and larger computer systems, a system crash can have a devastating impact on many users, including both company employees as well as its customers.

Being unable to prevent system crashes, computer system designers attempt to limit the effect of system crashes. The field of study concerning how computers recover from system crashes is known as "recovery." Recovery from system crashes has been the subject of much research and development.

In general, the goal of redo recovery is to return the computer system after a crash to a previous and presumed correct state in which the computer system was operating immediately prior to the crash. Then, transactions whose continuations are impossible can be aborted. Much of the recovery research focuses on database recovery for database computer systems, such as network database servers or mainframe database systems. Database system designers attempt to design the database recovery techniques which minimize the amount of data lost in a system crash, minimize the amount of work needed following the crash to recover to the pre-crash operating state, and minimize the performance impact of recovery on the database system during normal operation.

FIG. 1 shows a database computer system 20 having a computing unit 22 with processing and computational capabilities 24 and a volatile main memory 26. The volatile main memory 26 is not persistent across crashes and hence is presumed to lose all of its data in the event of a crash. The computer system also has a non-volatile or stable database 28 and a stable log 30, both of which are contained on stable memory devices, e.g. magnetic disks, tapes, etc., connected to the computing unit 22. The stable database 28 and log 30 are presumed to persist across a system crash. The stable database 28 and log 30 can be combined in the same storage, although they are illustrated separately for discussion purposes.

The volatile memory 26 stores one or more applications 32, which execute on the processor 24, and a resource manager 34. The resource manager 34 includes a volatile cache 36, which temporarily stores data destined for the stable database 28. The data is typically stored in the stable database and volatile cache in individual units, such as "pages." A cache manager 38 executes on the processor 24 to manage movement of data pages between the volatile cache 36 and the stable database 28. In particular, the cache manager 38 is responsible for deciding which data pages should be moved to the stable database 28 and when the data pages are moved. Data pages that are moved from the cache to the stable database are said to be "flushed" to the stable state. In other words, the cache manager 38 periodically flushes the cached state of a data page to the stable database 28 to produce a stable state of that data page which persists in the event of a crash, making recovery possible.

The resource manager 34 also has a volatile log 40 that temporarily stores computing operations to be moved into the stable log 30. A log manager 42 executes on the processor 24 to manage when the operations are moved from the volatile log 40 to the stable log 30. The transfer of an operation from the volatile log 40 to the stable log 30 is known as a log flush.

During normal operation, an application 32 executes on the processor 24. The resource manager 34 receives requests to perform operations on data from the application. As a result, data pages are transferred to the volatile cache 36 on demand from the stable database 28 for use by the application. During execution, the resource manager 34 reads, processes, and writes data to and from the volatile cache 36 on behalf of the application. The cache manager 38 determines, independently of the application, when the cached data state is flushed to the stable database 28.

Concurrently, the operations being performed by the resource manager on behalf of the application are being recorded in the volatile log 40. The log manager 42 determines, as guided by the cache manager 38 and the transactional requirements imposed by the application, when the operations are posted as log records on the stable log 30. A logged operation is said to be "installed" when it does not need to be replayed in order to recover the database state. This is usually accomplished by flushing the versions of the pages containing the changes made by the operation to the stable database 28.

When a crash occurs, the application state (i.e., address space) of any executing application 32, the data pages in volatile cache 36, and the operations in volatile log 40 all vanish. The computer system 20 invokes a recovery manager which begins at the last flushed state on the stable database 28 and replays the operations posted to the stable log 30 to restore the database of the computer system to the state as of the last logged operation just prior to the crash.

One prior art approach to database recovery is to require the cache manager to flush the entire cache state periodically. The last such flushed state is identified in a "checkpoint record" that is inserted into the stable log. During recovery, a redo test is performed to determine whether a logged operation needs to be redone to help restore the system to its pre-crash state. The redo test is simply whether an operation follows the last checkpoint record on the log. If so (meaning that a later operation occurred and was posted to the stable log, but the results of the operation were not installed in the stable database), the computer system performs a redo operation using the log record.

This simple approach has a major drawback in that writing every change of the cached state out to the stable database 28 is practically infeasible because it involves a high volume of input/output (I/O) activity that consumes a disproportionate amount of processing resources and slows the system operation. It also requires atomic flushing of multiple pages, which is a troublesome complication. This was the approach used in System R, described in Gray, McJones, et al., *The Recovery Manager of the System R Database Manager*, ACM Computing Surveys 13,2 (June, 1981) pages 223–242.

Crash recovery requires that the stable database 28 be accessible and correct. Media recovery provides recovery from failures involving data in the stable database. It is also a last resort to cope with erroneous applications that have corrupted the stable database. In some systems, to guard against stable database failures, the media recovery system provides an additional copy of the database called a backup database 29, and a media recovery log (e.g., stable log 30) is applied to the backup database 29 to roll its state forward to the desired state, usually the most recent committed state. To recover from failures, the media recovery system first restores the stable database 28 by copying the backup database 29, perhaps stored on tertiary storage, to the usual secondary storage that contains the stable database 28. Then the media recovery log operations are applied to the restored stable database 28 to "roll forward" the state to the time of the last committed transaction (or to some designated earlier time).

Backing up the stable database 28 is considered to be "on-line" if it is concurrent with normal database activity, and is considered to be "off-line" if concurrent activity is precluded. Restoring the erroneous part of the stable database 28 with a copy from the backup database 29 is usually an off-line process. Media failure frequently precludes database activity, so the database usually has to be off-line during restore. Off-line restore has little impact on availability because restore only occurs after media failure which is a low frequency event. Off-line restore poses no technical problems unique to logical operations. High availability requires on-line backup. Thus, on-line backup is desirable, especially when logical operations, those that involve more than a single object or page, are logged.

Rolling forward the restored stable database 28 involves redo recovery, which, for logical operations, has been described in Lomet, D. and Tuttle, M., *Redo Recovery From System Crashes*, VLDB Conference, Zurich, Switzerland (September 1995) 457–468, and Lomet, D. and Tuttle, M., Logical Logging To Extend Recovery To New Domains, ACM SIGMOD Conference, Philadelphia, Pa. (May 1999) 73–84.

Traditionally, database systems exploit two kinds of log operations: physical operations and physiological operations. A physical operation updates exactly one database object. No objects are read, and data values to be used in the update come from the log record itself. An example of this is a physical page write, where the value of the target page is set to a value stored in the log record. A physiological operation, as described in Gray, J. and Reuter, A., *Transaction Processing: Concepts and Techniques*, Morgan Kaufinann (1993) San Mateo, Calif., also updates a single object, but it also reads that page. Hence, a physiological operation denotes a change in the page value (a state transition). This avoids the need to store the entire new value for the target page in the log record. An example of this is the insert of a record onto a page. The page is read, the new record (whose value is stored in the log record) is inserted, and the result is written back to the page.

These two forms of log operations (also called page-oriented operations) make cache management particularly simple. Updated (dirty) objects in the cache can be flushed to the stable database 28 in any order, so long as the write ahead log (WAL) protocol is obeyed. For databases, pages are the recoverable objects and records are frequently the unit of update. Both are small. Thus, the importance of simple cache management can be allowed to control the form of log operation, thereby restricting operations to the traditional varieties.

When extending recovery to new domains, the cost of logging may become the dominant consideration. Logical log operations can greatly reduce the amount of data written to the log, and hence reduce the normal system operation cost of providing recovery. A log operation is logical, as opposed to page-oriented, if the operation can read one or more objects (pages) and write (potentially different) multiple objects.

Some examples of how logical logging can substantially reduce the amount of logging required during normal execution, and hence reduce recovery overhead include application recovery, file system recovery, and database recovery, as described below.

Logical log operations for recovering an application state include: (1) R(X,Appl) in which an application "Appl" reads an object or file X into its input buffer, transforming its state to a new state Appl'. Unlike page-oriented operations, the values of X and Appl' are not logged. (2) Wl(Appl, X) in which Appl writes X from its output buffer and the application state is unchanged. Unlike page-oriented operations, the new value of X is not logged. (3) Ex(Appl) in which the execution of Appl between resource manager calls is a physiological operation that reads and writes the state of Appl. Execution begins when control is returned to Appl, and results in the new state when Appl next calls the resource manager. Parameters for Ex(Appl) are in the log record.

Logical log operations can reduce logging cost for file system recovery. A copy operation copies file X to file Y. This same operation form describes a sort operation, where X is the unsorted input and Y is the sorted output. In neither case are the data values of X or Y. logged. The transformations are logged with source and target file identifiers. Were page oriented operations used, one could not avoid logging the data value of Y or X.

Logical log operations are useful in database recovery, e.g., for B-tree splits. A split operation moves index entries with keys greater than the split key from the old page to the new page. A logical split operation avoids logging the initial contents of the new B-tree page, which is unavoidable when using page-oriented operations.

The logging economy of logical operations is due to the operand identifiers being logged instead of operand data values because the data values can come from many objects in the stable state. Because operands can have very large values, e.g., page size or larger, logging an identifier (unlikely to be larger than 16 bytes) is a great savings. With applications or files, values may be measured in megabytes.

Logical log operations complicate cache management because cached objects can have flush order dependencies. As an example, for the operation copy(X,Y), which copies the value of object X to the object Y, the updated value Y must be flushed to the stable database 28 before object X (if it has been subsequently-updated) is flushed to the stable database 28, which would overwrite its old value. If an updated X is flushed before Y is flushed, a system failure will lose the old value of X needed to make replay of the copy operation possible. Hence, a subsequent redo of the copy operation will not produce the correct value for Y.

These flush dependencies complicate the task of high speed on-line backup.

In early database systems, the database was taken off-line while a backup was taken. This permitted a transaction or operation consistent view of the database to be copied at high speed from the "stable" medium of the database. Such off-line techniques work for log-based recovery schemes and permit high speed backup. However, the system is then unavailable during the backup process. Current availability requirements usually preclude this approach.

A conventional method of backup is a "fuzzy dump" which depends upon constructing the backup by copying directly from the stable database 28 to the backup database 29, independent of the cache manager 38. Therefore, the state captured in the backup database is fuzzy with respect to transaction boundaries. Coordination between backup process and active updating when traditional log operations are used occurs at the disk arm. That is, backup captures the state of an object either before or after some disk page write, assuming I/O page atomicity. The backup database remains recoverable because page-oriented operations permit the flushing of pages to a stable database in any order. Because logged operations are all page-oriented, the backup database is operation consistent, i.e., results of an operation are either entirely in the backup database, or are entirely absent, and selective redo of logged operations whose results are absent from the backup database will recover the current active stable database.

The media recovery log includes all operations needed to bring objects up-to-date. The on-line system, which is updating the stable database and logging the update operations, does not know precisely when an object is copied to the backup database, and so is preferably "synchronized" with the backup process to ensure the log will contain the needed operations. For page-oriented log operations, synchronization between backup and the cache manager only occurs at the beginning of the backup. (Data contention during backup to read or write pages is resolved by disk access order.) The media recovery log scan start point can be the crash recovery log scan start point at the time backup begins. The backup database will include all operation results currently in the stable database at this point, plus some that are posted during the backup. Hence, this log, as subsequently updated by later updates, can provide recovery to the current state from the backup database as well as from the stable database. Subsequently, backup is independent of the cache manager, and can exploit any technique to effect a high speed copy. This usually involves sweeping through the stable database copying pages in a convenient order, e.g., based on physical location of the data. Different parts can be copied in parallel as well.

Incremental backup methods have also been described in which a temporal index structure can be managed to ensure there is adequate redundancy so that recovery can restore the current state. But this approach cannot currently be exploited because database systems lack temporal index support.

Conventional database backup methods do not work with logical operations and cannot support an on-line backup involving high speed copying while update activity continues. The fuzzy backup technique described above depends on logged operations being page-oriented. But logical log operations can involve multiple pages (or objects) and updated objects (e.g., pages) must be flushed (copied) to the stable database 28 in a careful order for the stable database 28 to remain recoverable. Objects updated by logical operations have the same ordering constraints when flushed to the backup database 29 to ensure correct media recovery.

A fundamental problem is that flush dependencies must be enforced on two databases, the stable database 28 and the backup database 29. A "logical" solution to this problem is to stage all copying from the stable database 28 to the backup database 29 through the cache manager, and flush dirty data synchronously (a "linked" flush) to both the stable database 28 and the backup database 29. That is, dirty data flushed to the stable database 28 is also flushed to the backup database 29 such that the next flush of dirty data does not commence until the prior "linked" flush to both the stable database 28 and the backup database 29 has completed. However, copying from the stable database 28 to the backup database 29 via the database cache is unrealistic for page-oriented operations because of the performance impact. Pursuing this for logical log operations, where "linked" flushes are required, is even less realistic.

To efficiently create an on-line backup involves an "asynchronous" copy process that does not go through the cache manager. But the task of keeping the backup database 29 recoverable so that media failure recovery is possible is the same task as with crash recovery and the stable database 28. Flushing is preferably restrained so that the flush dependencies that are enforced for the stable database 28 are also enforced for the backup database 29. Unfortunately, when an asynchronous on-line backup is in progress, flushing objects to the stable database 28 in the order required for crash recovery does not ensure that objects are flushed in the correct order to the backup database 29 for media recovery.

Thus, the present invention is directed to on-line database backup that copies data at high speed from the active stable database to the backup database while update activity continues. The inventor has developed an improved backup technique that correctly protects the database from media failures, while permitting the logging of logical operations. This technique provides a high speed, on-line backup. This ensures that the results of logged logical operations are flushed to the backup database in the correct order, and hence the backup database remains recoverable, without tight coupling with the cache manager.

SUMMARY OF THE INVENTION

This invention concerns a database computer system and method for backup when general logical operations are logged. Data is copied from the active stable database to a backup database while update activity continues. The stable database can be divided into disjoint partitions, and backup progress can be independently tracked in each partition. For each partition in which backup progress is to be tracked independently, two boundary values are maintained that separate objects into categories of pending, backed up, or in doubt. To permit backup to proceed with little synchronization between it and the cache manager, backup reports its progress only from time to time. Depending on system tuning considerations, the reporting can be made more or less precise by varying the granularity of the steps in which backup progress is reported.

According to one implementation, in a database computer system having a non-volatile memory including a stable log and a stable database comprising a plurality of objects, a cache manager for flushing objects to the stable database, and a backup database, a computer-implemented method comprises the following steps: (a) copying objects from the "in doubt" region of the stable database to the backup database, this region of the stable database being bounded by a first boundary value and a second boundary value; (b) adjusting the first boundary value and adjusting the second boundary value to define a new "in doubt" region of the stable database; and (c) continuing the copying objects from this further region of the stable database to the backup database. Preferably, steps (b) and (c) are performed until all of the objects of the stable database have been copied to the backup database. Objects bounded by the first boundary value have been "backed up". Objects bounded by the second boundary value are "pending".

Aspects of this invention include adjusting the first boundary value by setting the first boundary value equal to the second boundary value and adjusting the second boundary value by increasing the second boundary value by a predetermined increment.

According to other aspects of the present invention, each object is associated with a value, and the objects are copied in ascending order of value.

According to other aspects of the present invention, a backup latch is provided to prevent the boundary values from being altered while the cache manager is flushing pages.

According to other aspects of the present invention, the backup is synchronized with the cache manager at a predetermined time, such as when the values of the boundaries are being adjusted.

According to other aspects of the present invention, writing the value of an object to the log can avoid the need to include the object's value in the backup.

According to other aspects of the present invention, some of the extra writing of objects to the log can be avoided by the tracking of backup progress as described above.

According to other aspects of the present invention, some of the extra writing of objects to the log can be avoided by restricting the logical log operations to a form called "tree operations".

The foregoing and other aspects of the present invention will become apparent from the following detailed description of the invention when considered in conjunction with the accompanying drawings.

DETAILED DESCRIPTION OF THE PREFERRED EMBODIMENT

In accordance with the present invention as described herein, it is understood that an object can be written to the recovery log as a substitute for being flushed to the stable database or the backup database. Thus, the object version needed to ensure correct media recovery is then available from the log. Moreover, knowledge of the order in which objects in the stable database are copied to the backup database can avoid some of the extra logging described herein, hence improving backup efficiency. Furthermore, limiting the forms of logical operations can limit the flush orderings that arise, and exploiting this can further reduce the logging required to keep the backup recoverable.

Figure 1:
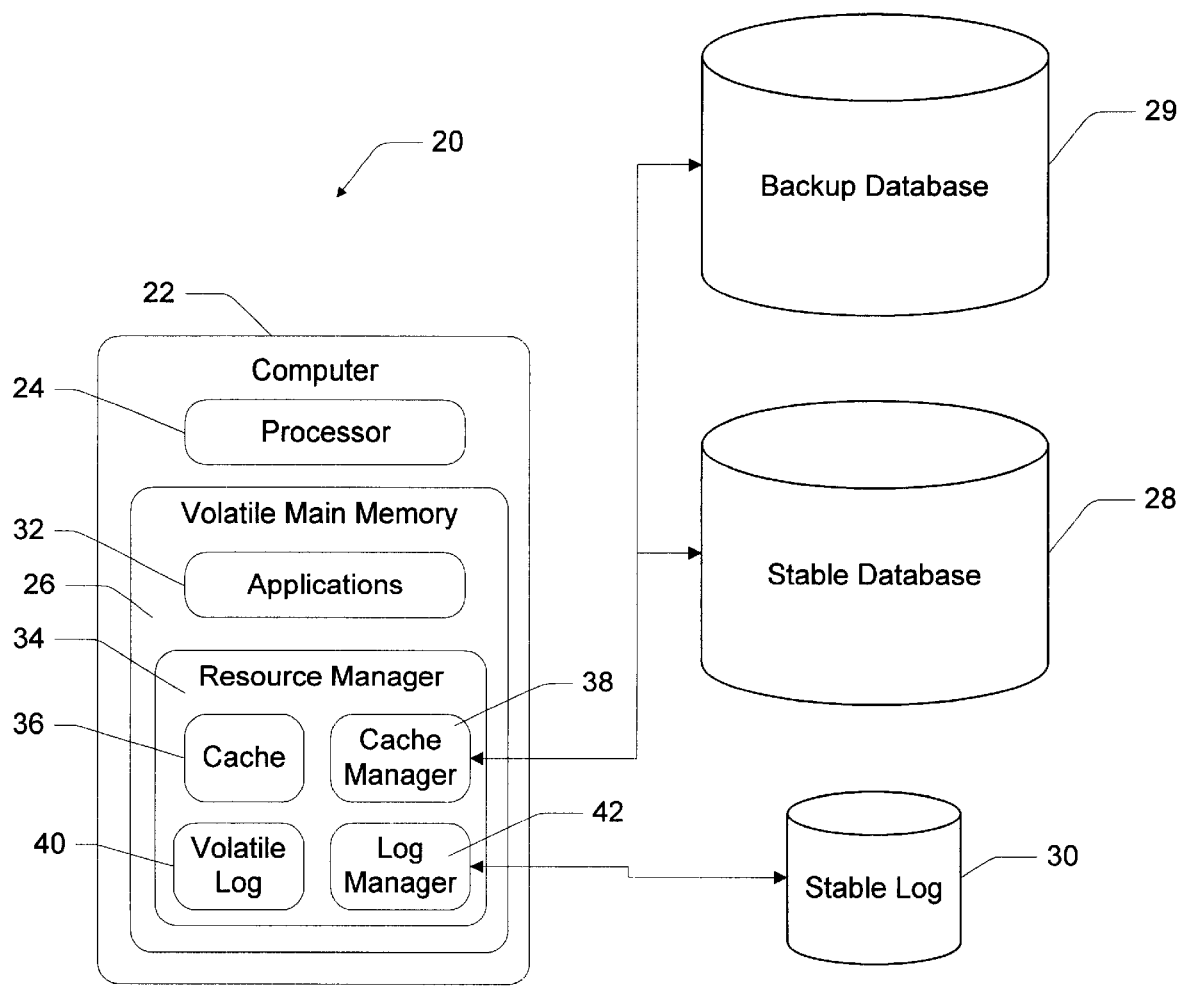
FIG. 1 (prior art) is a diagrammatic illustration of a conventional database computer system.
Figure 2:
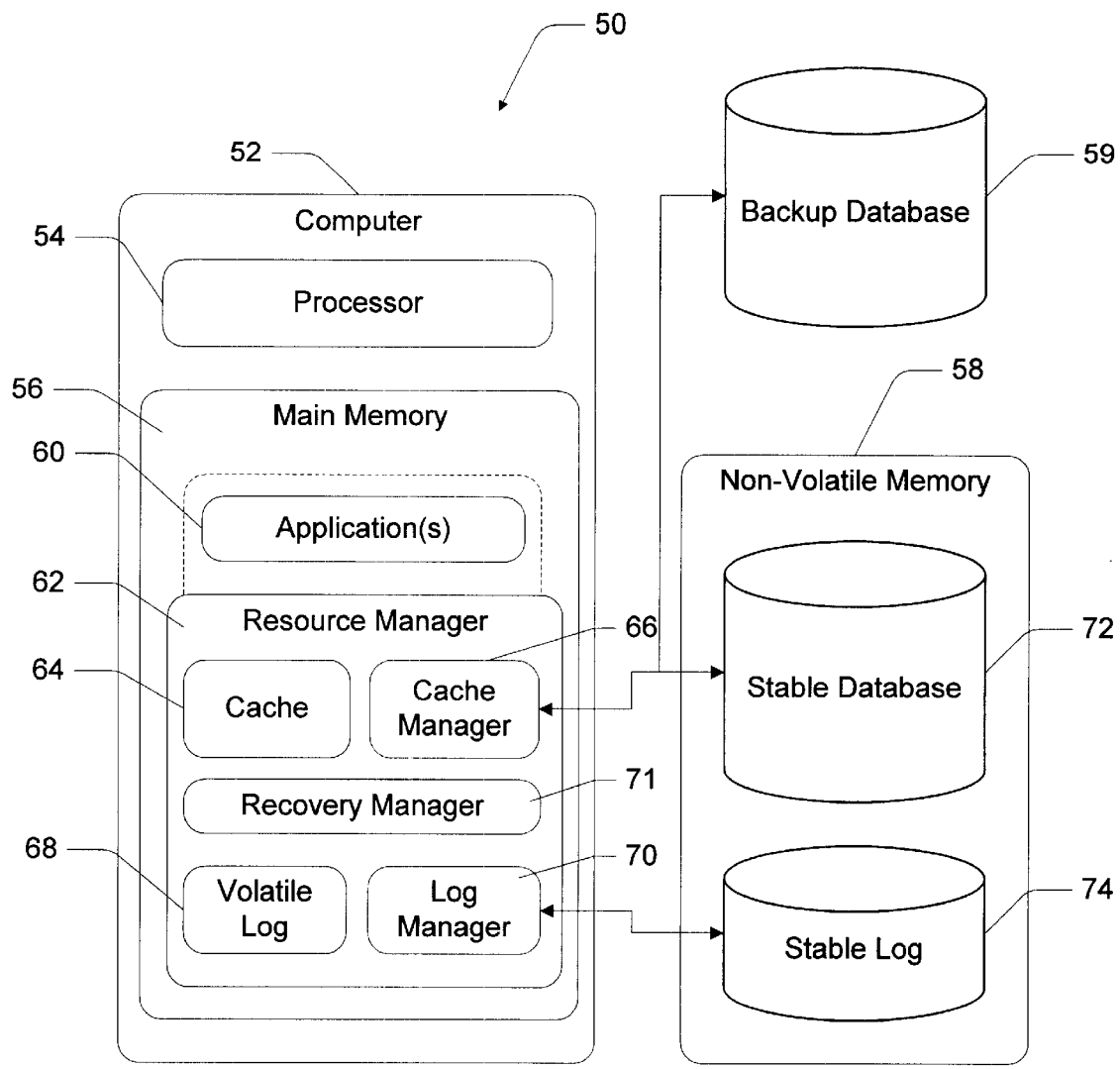
FIG. 2 is a diagrammatic illustration of a database computer system according to an implementation of this invention.

FIG. 2 shows a database computer system 50 having a computing unit 52, with a processing unit 54 and a volatile main memory 56, and a non-volatile memory 58 interfaced with the computer unit 52. The volatile main memory 56 is not persistent across system crashes. It is presumed to lose all data that it presently stores when a crash occurs. Main memory 56 can be implemented, for example, as volatile RAM. On the other hand, the persistent memory 58 is presumed to persist across a system crash. Examples of persistent memory 58 include disk arrays, disk drives (e.g., hard and floppy), read/write CD ROMS, tape backups, reel-to-reel, and the like.

The database computer system 50 is shown in an operational state in which one or more applications 60 are loaded in main memory 56 for execution on the processing unit 54. The application programs 60 are permanently stored on non-volatile memory (such as the persistent memory 58) and loaded into the main memory 56 when launched. The applications are representative of single threaded or multi-threaded applications.

The main memory 56 further includes a resource manager 62 which maintains temporary copies of the data pages and application states. The resource manager is responsible for managing when to flush data objects and application objects, and hence when to install operations into the persistent memory 58. It is also responsible for posting operations from the volatile log to the stable log. This must be done before the results of an operation are installed in the stable state, thus enforcing a write-ahead log protocol. The resource manager 62 is callable by the application programs 60 and mediates all data communication directed to and originating from the applications.

The resource manager 62 includes a volatile cache 64, a cache manager 66, a volatile log 68, a log manager 70, and a recovery manager 71. The volatile cache 64 contains cached states of any executing application 60, and the data pages retrieved from the persistent memory 58. The volatile log 68 tracks the operations performed by the computer system.

The non-volatile memory 58 includes a stable database 72 and a stable log 74. The stable database 72 maintains stable versions of objects, and the stable log 74 maintains a stable sequence of logged computer operations. The database 72 and log 74 are shown separately, but can be implemented in the same storage subsystem.

The cache manager 66 manages the volatile cache 64 and is responsible for retrieving data records from the stable database 62 and periodically flushing modified data records back to the stable database 72. Additionally, the cache manager 66 manages when to flush cached objects, including the application state as an object to be updated in the stable database 72. The log manager 70 manages the volatile log 68 and facilitates posting operations from volatile log 68 onto the stable log 74. In doing that, it enforces the write-ahead log protocol as directed by the cache manager 66.

A backup database 59 is provided that stores a backup copy of the stable database 72. The backup database 59 preferably resides in a non-volatile memory such as a disk drives (e.g., hard and floppy), read/write CD ROMS, tape backups, reel-to-reel, and the like. According to the invention, the data from the stable database 72 is copied to the backup database 59.

The database computer system 50 is representative of many diverse implementations, including a database server for a network of PCs or workstations, an online server for Internet service providers, a mainframe computing system, and the like. The database computer system 50 runs an operating system (not shown), which is preferably a multi-tasking operating system which allows simultaneous execution of multiple applications or multiple threads of one or more applications. Examples of suitable operating systems include a Windows® brand operating system sold by Microsoft Corporation, such as the Windows NT® workstation operating system, as well as UNIX based operating systems.

Flush Dependencies and Recoverability

There are several key elements of redo recovery: an installation graph, a write graph, and a redo test. An installation graph prescribes the order in which the effects of operations must be "placed" into stable storage in order for recovery to be possible. Informally, an installed operation is one that need not be replayed during recovery because its effects do not need to be regenerated for recovery to succeed. An uninstalled operation is one that needs to be replayed for recovery to succeed. A write graph translates the installation order on operations into an order for flushing updated objects to stable storage. If updated objects are flushed to stable storage in write graph order, then operations that have updated the objects will be installed into the stable state in installation order. A redo test is used during recovery to determine which operations to replay. All operations considered uninstalled by the cache manager during normal execution will require replay. Some redo tests can be relatively crude, and result in the replay of additional operations, and recovery can still succeed.

If the cache manager flushes updated objects to the stable database in write graph order, installation order is enforced and recovery, exploiting a redo test, can recover the database.

The installation graph is similar to the conflict graph of serializability theory. Installation graph nodes are log operations and edges are conflicts between these operations. A log operation reads and writes objects. There are two kinds of installation edges: read-write edges and write-write edges. A read-write edge occurs when the write operation writes data into a read variable set which is read in an operation preceding the write operation, thereby overwriting needed data to carry out the read operation during recovery. Hence, the database will not be recoverable. Similarly, a write-write edge occurs when the write operation writes data into a write variable set which is written in an operation preceding the initial write operation. Installation graphs and the read-write edge case are described in detail in a publication by David B. Lomet and Mark R. Tuttle, entitled "Redo Recovery after System Crashes," *Proceedings of the 21st VLDB Conference*, Zurich Switzerland, 1995. This publication is incorporated by reference.

To manage dependencies, the database computer system is equipped with a cache manager 66 that is attentive to flushing sequence. The cache manager 66 is designed to ensure that objects are flushed to stable database 72, thereby installing their associated operations, before any modified data objects from which the operations have read are flushed to stable database 72. The cache manager 66 implements an object table which tracks active objects in the volatile cache 64, and monitors flush order dependencies between those objects.

After a crash, a set I of installed operations is identified that explains the stable system state. I is a prefix of the installation graph, so that installation order is enforced. A prefix I of the installation graph explains the stable system state for each object in the stable database 72 as either exposed or unexposed. An exposed object's value is needed for recovery and equals the value written by the last operation. An unexposed object's value is overwritten during recovery before it can be read by an uninstalled operation. Thus, recovery does not depend on an unexposed object.

After a crash, the stable state is recoverable if it is explainable and the log 74 contains all uninstalled operations (those that need to be redone). The recovery task of cache management is to guarantee that there is always a set of installed operations I that explains the stable state. A redo test ensures that replayed operations keep the database explainable. The cache manager 66 uses a write graph to ensure that there is at least one I that explains the stable state, thereby ensuring that the stable database 72 remains recoverable.

Figure 3:
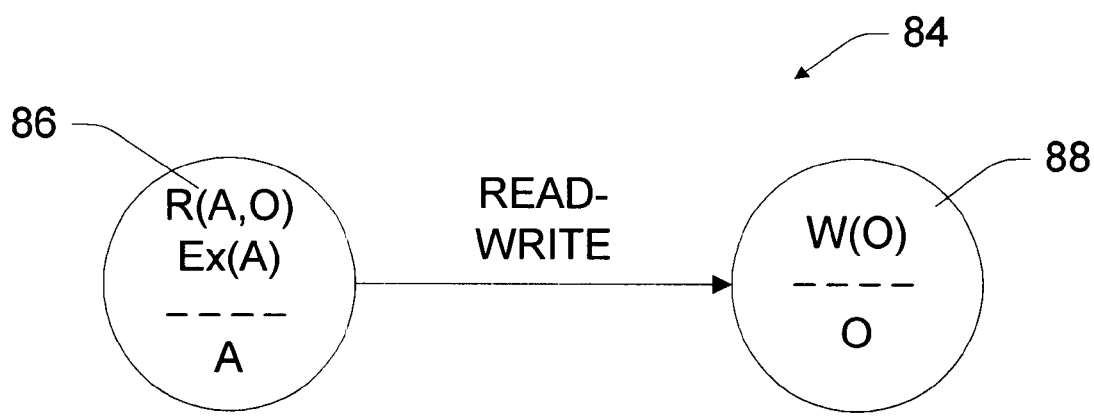
FIG. 3 is a write graph that illustrates a flush dependency between an application object and a data object.

FIG. 3 shows a write graph 84 with a read-write edge in which a read operation reads a data object O at a first state during execution of the application object A, and subsequently a write operation writes the data object O to create a second state of that data object. In write graph notation, the circles represent nodes. A write graph node n is characterized by a set of operations ops(n) and a set vars(n) of variables (i.e., objects) written by the operations in ops(n). There is an edge between write graph nodes m and n if there is an installation graph edge between an operation in ops(m) and an operation in ops(n). The cache manager 66 installs the operations of ops(n) by flushing the objects of vars(n) atomically.

Write graph 84 has two nodes, node 86 with vars(86)={A} and node 88 with vars(88)={O}. The node 86 shows that the read operation has been performed which changes application A's state (by reading values into A's buffers) and that A has continued its execution with an Ex(A) operation. The node 88 shows that the write operation affects object O's state.

Write graph 84 demonstrates a flush order dependency between application A and data object O. To ensure correct recovery of the application, the cache manager 66 flushes A of node 86, thereby installing the read operation, prior to flushing data object O of node 88.

Many write graphs can be constructed from an installation graph. For example, a single node that calls for atomically flushing the entire cache is always sufficient to ensure recovery regardless of installation graph. However, it should be clear that the more nodes into which the uninstalled operations and the objects that they write can be divided, the more flexibility the cache manager has.

Figure 4:
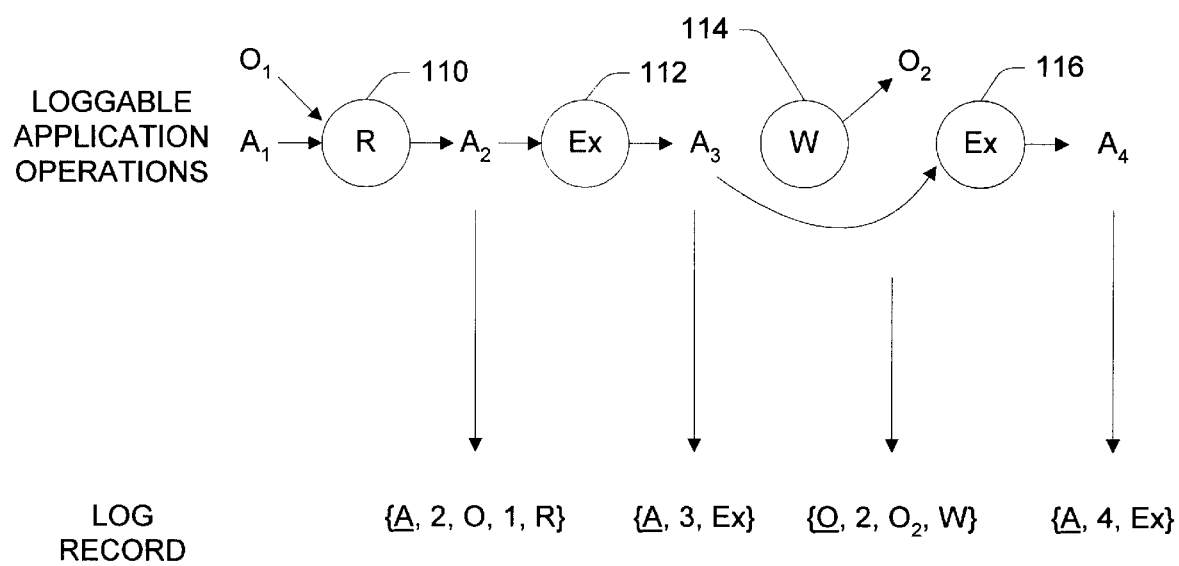
FIG. 4 is a diagrammatic illustration of the sequence of operations, which shows a read optimizing technique for logging operations and objects affected by read operations.

The operation sequence in FIG. 4 introduces a dependency between the application object A and the data object O. Assume, for example, that the cache manager flushes the data object O to stable memory at state $O^2$ after the write operation 114 without having previously flushed the application object A to install the operations 110 and 112 preceding the write operation 114. Then, before the cache manager has an opportunity to flush the application object A, the system crashes. Upon replay of the log, the computer database system is unable to redo the operations to resurrect the true application states $A_2$–$A_4$ because the object state $O_1$ is not available. That is, the stable database 72 only contains the flushed object O at state 2, not at its initial state 1.

This dependency is explained in the context of an installation graph as a read-write write edge. That is, the write operation writes data into objects which are read in an operation preceding the write operation, thereby overwriting needed data to carry out the read operation during recovery.

Logical logging efficiency comes at the expense of introducing flush order dependencies to ensure proper installation of operations. In FIG. 4, the flush dependencies are "acyclic," meaning that each object can be flushed atomically independently of other objects in a prescribed order, without requiring the simultaneous atomic flushing of multiple objects.

Unfortunately, flush dependencies can be "cyclic". For example, an object that is both read and written by an application must be flushed both before (actually, not later than) and after (actually, not earlier than) the application object. This cyclic flush dependency requires atomically flushing both the data object and the application object simultaneously, which presents significant complications.

Figure 5:
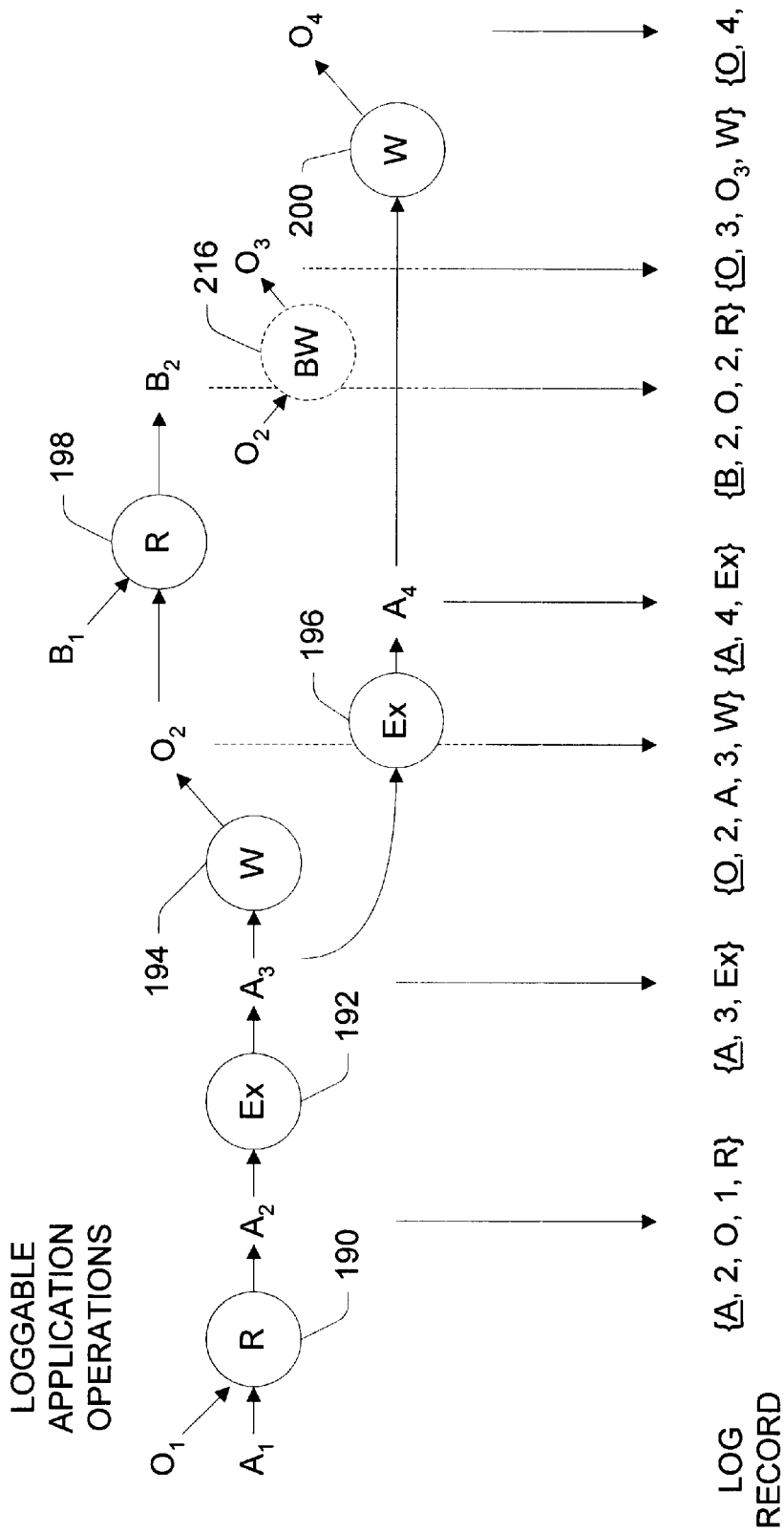
FIG. 5 is a diagrammatic illustration of a sequence of logical application operations and shows the corresponding log records for those operations.

FIG. 5 shows a technique for reducing the number of objects in a multi-object write graph node. This technique exploits the fact that unexposed objects do not need to have any specific value in order for an installation graph prefix to explain the database state. Hence, a blind write operation, in which an object is written, but not read, can present an opportunity to remove the written object from the set of objects that need to be flushed in a prior write graph node. The cache manager may not, however, wish to wait for a subsequent write operation of one of the objects in the write graph node, such as write operation 200, because such operations cannot be foreseen and are not guaranteed to occur. Accordingly, the cache manager can impose its own write of an object in the multi-object write graph node. The cache manager performs a "blind identity write" that writes the value of the object onto the stable log. FIG. 5 shows a blind write operation 216 which writes the values of the data object O at state 3, i.e., $O_3$, to the log record. The blind write creates an after-image of the data object O on the log. The blind write in this case is an identity write because the identical value of data object O, which is the same at both states 2 and 3, is written to the log.

Once the value $O_3$ is posted to stable log and all nodes that precede the node with operations 190–196 have been installed, and any write graph node with an operation that read the object O in its earlier state, e.g. the node with $R_{198}$, the cache manager is free to flush the application object A, thereby installing operations 190–196. If the system crashes after object A is flushed and application state $A_3$ is irretrievably lost, subsequent operations involving the data object O at state 3, can be replayed using the values $O_3$ on the stable log, rather than the values from the output buffers of a regenerated application state $A_3$. Blind writes come at a cost of writing larger amounts of data to the log, but this cost is minimal in comparison to the advantages gained by the write optimization techniques in which a high percentage of writes do not result in posting entire object values to the log.

The cache manager-initiated blind write has the same effect of removing an object from a node in the write graph as a normal write operation. In both cases, the value of an object is available from the log for recovery instead of being available from the stable database state. But such a write is under the control of the cache manager, and hence the cache manager can use such writes to help it manage the cache.

Backup for General Logical Operations

It is now described how to provide high speed, on-line backup when general logical operations are logged, in accordance with the present invention. For general operations, additional logging for "installation without flushing" (described below) is performed whenever it is not known whether the flush order dependencies between objects will be enforced for the current backup as well as for the stable database.

Preserving backup database 59's recoverability is difficult because it is not known when an object will be copied to the backup database 59 when the backup is only loosely synchronized with cache management. The flush order prescribed by the write graph for flushing to the stable database is thus preferably enforced for the flush to the backup database 59 when an object is flushed to the stable database 72. But that write graph may be different from the write graph that exists when an object is copied to the backup database 59. For general operations, where it can be impossible to anticipate what a later write graph may be, an approach of guaranteeing installation order regardless of changes to the write graph is required.

When logged operations are logical and hence create flush order dependencies, a backup order (total or partial) is defined that constrains when objects in the stable database 72 will be copied to the backup database 59 in accordance with the present invention. Each recoverable object is in this ordering. The progress of the backup is tracked in terms of how far it has gone in this ordering. While this constrains the backup process, the backup retains great flexibility in how it sequences the copying of the stable database 72 to the backup database 59. The backup process is characterized in terms of whether a backup is active and its progress is characterized in terms of the backup order. The testing of this characterization represents the desired synchronization between the backup process and cache management.

The backup progress relative to the objects that are to be flushed from the cache determines how the cache is managed. Either objects are flushed from the cache normally to install operations, or cache manager identity writes are injected to ensure that object values are present on the log when they are needed and might not end up in the backup database 59. This is referred to as "installation without flushing" in which the number of objects requiring flushing to the stable database is reduced to zero.

Assuming a write graph node n has no predecessor write graph nodes, to keep the stable database 72 recoverable from a system crash, its objects (those in vars(n)) are atomically flushed to the stable database 72. If a backup is not in progress, this suffices. If a backup is in progress, the set of operations associated with the node n need to be simultaneously installed into the backup database 59. This permits the use of a single write graph.

There are two cases involved with the backup: "pending" and "not pending". In the "pending" case, the objects of a write graph node n (usually there will only be a single object so that atomic flushing can be ensured by disk write atomicity) are known to have not yet been backed up. Hence, their new values will become part of the backup database 59 if they are written (flushed) to the stable database 72.

Therefore, this write effectively installs the operations of node n in the backup database 59 as well. Write graph nodes that follow the current node (in write graph order) to maintain installation order, in fact do so correctly for the backup database 59 as well as for the stable database 72.

In the "not pending" case, an object may already have been copied to the backup database 59. Hence, flushing now to the stable database 72 does not necessarily install the operations associated with node n in the backup database 59. However, the operations can be installed into the backup database 59 without flushing any objects. Cache manager identity write log operations are introduced to handle these objects. These operations result in the objects being written to the recovery log, and hence, also (since the recovery log is part of the media recovery log) to the media recovery log for the backup database 59.

In both cases above, the operations of write graph node n are installed into the active backup database at substantially the same time that they are installed into the stable database. And, importantly, in all cases, the flush dependencies imposed by the write graph are enforced.

The backup ordering (determining whether an object is pending or not pending), and how backup progress is tracked relative to this order is now described. It is this ordering that determines whether an object being flushed to the stable database 72 will appear in the backup database 59.

Backup Order

A value $X'$ in the backup order is associated for each object X such that for any other object Y, if $Y'<X'$, then X will be copied to the backup database 59 before Y. Where these values are not ordered, no knowledge exists about the relative order of copying the objects to the backup database 59. The progress of a backup is tracked in terms of these values, which can be derived from the physical locations of data on disk.

In accordance with the present invention, the database is divided into disjoint partitions, and backup progress is independently tracked in each partition. This permits the backing up of partitions in parallel. If no single operation can read or write objects from more than a single partition, backup progress can be independently tracked for each partition and the copying of the partitions from the stable database 72 to the backup database 59 can be arbitrarily interleaved. The degenerate case where each object is a partition is produced when operations are page-oriented, and backing up a partition is an atomic action.

Tracking Backup Progress

To permit backup to proceed with little synchronization between it and the cache manager, backup reports its progress only from time to time. Depending on system tuning considerations, the reporting can be made more or less precise by varying the granularity of the steps in which backup progress is reported.

Figure 6:
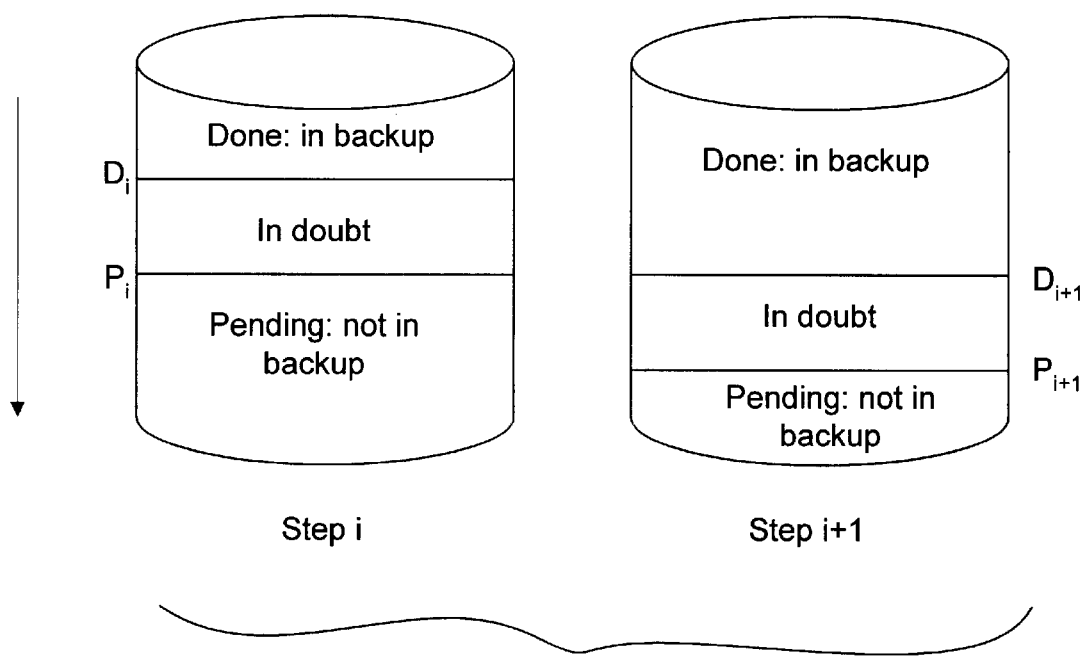
FIG. 6 is a diagram useful for explaining the tracking of backup progress in accordance with the present invention.

For each partition in which backup progress is to be tracked independently (there may be one or several), two values are maintained, "done" (represented herein as "D") and "pending" (represented herein as "P"), in the backup order, that divides objects in the partition into three sets, as described below and as shown in FIG. 6.

As shown in FIG. 6, the partition of the stable database being copied is divided into three regions for tracking backup progress: "done", "in doubt", and "pending". The "done" portion of the database includes objects that have already been copied to the backup database. The "pending" portion of the database includes objects that have not yet been copied to the backup database. The "in doubt" portion of the database includes objects in which it is not known with certainty whether or not they have been backed up. Backup progress proceeds in the direction of the arrow. At each step of the backup process, the previously "in doubt" part of the database becomes part of the database known to be copied to the backup database (i.e., "done"), and the part of the database previously known to not be in the backup (i.e., "pending") is divided, with part now considered to be "in doubt", and the rest continuing to be "pending" (known not to be yet in the backup). These are tracked by the values of P and D during each step i.

When $X'<D$ (i.e., the value of X is less than the location of the "done" boundary), it is known that X has been copied to the backup database 59. Hence, subsequently flushed values for X will not appear in the backup database 59. When $X'>P$, X has not yet been copied to the backup database 59. Hence, X, if flushed before P is permitted to change, will appear in the backup database 59. When $D<X'<P$, it is unknown whether or not X has been copied to P. Hence, it is not known whether a subsequently flushed X will appear in the backup database 59 or not. If $X'$ is not ordered relative to P or D, then it is not known whether it has been backed up or not, and it is treated as if it were "in doubt".

Figure 7:
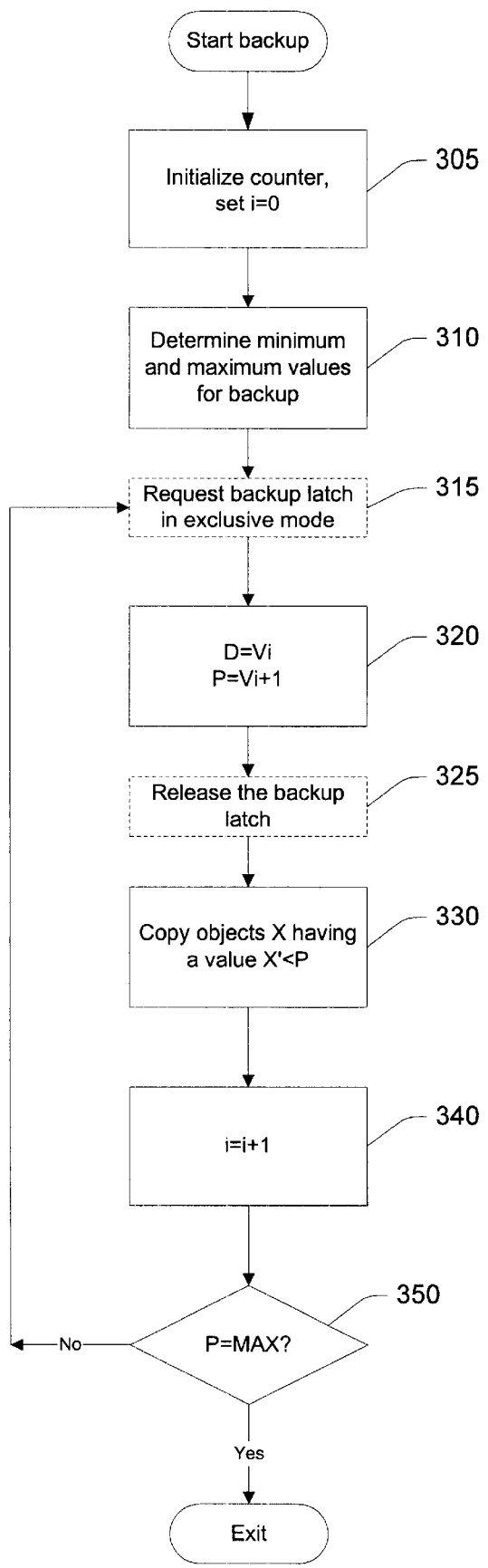
FIG. 7 is a flow chart of an exemplary method of backing up the stable database in accordance the present invention.

An exemplary method of backing up in accordance with an embodiment of the present invention is shown in FIG. 7. At step 305, a step counter i is initialized (i=0). At step 310, a maximum value MAX and a minimum value MIN are determined such that for all X in the partition to be backed up, $MIN<X'<MAX$. These minimum and maximum values allow for the initiation, termination, and tracking of the progress of the backup. At this point, MIN is set equal to the initial minimum boundary V0.

When backup starts, at step 320, D is set equal to the boundary value corresponding to the increment counter (D=Vi), and P is set to some higher boundary value (P=Vi+1). Objects X having a value $X'$ such that $D<X'<P$ are "in doubt" because progress is not tracked between D=V0 and P=Vi+1, which is the boundary for the first step. At step 330, all objects X having values $D<X'<P$ are copied to the backup database. After the backup has copied all objects having values less than P, the counter i is incremented (i=i+1) at step 340, and at step 350, it is determined if P equals MAX, the highest permissible value. If not, then backup processing continues in the predetermined increments at step 315, where the backup latch is re-acquired, and at 320, where D is set equal to P (via D=Vi using the incremented i value), and P is increased to a new value Vi+1, etc.

At this point, all the objects below P are copied, and P is then set equal to a higher value, the boundary for the next step, at step 320. Now, only objects having a value greater than the new value of P are pending and hence guaranteed not yet to be in the current backup. Objects between D=Vi and P=Vi+1 are "in doubt."

The iterative loop continues until P is set to MAX. At this point, there are no longer any pending objects and hence no objects, if now flushed, that are guaranteed to see the values for those objects appearing in the backup database. When the backup has completed, D is reset equal to P and MIN (i.e., D=P=MIN).

Backup progress reduces to a one step process when the only steps of backup progress are D=P=MIN and D=MIN, P=MAX. The only information then is whether backup is in progress or not. Backup need only synchronize with the cache manager when it changes the values of D and P. Hence, the granularity of synchronization can be varied, for example, from twice per backup (delimiting the duration of the backup) to many times, depending on the urgency to reduce the additional logging activity desired to keep B recoverable.

Synchronization

While the cache manager is flushing objects to the stable database, it desirably knows the state of backup progress; therefore, it checks D and P prior to flushing objects. However, unless additional measures are taken, the values D and P can change while flushing is in progress. To prevent this, synchronization is implemented between the cache manager and the backup process. This synchronization can be made at a granularity (in terms of number of steps) that is deemed appropriate for backup performance.

Because backup progress in each database partition is tracked independently, an optional backup latch per partition can be defined to permit partitions to be backed up in parallel. (Alternatively, the partitions can be backed up sequentially, thus ordering the partitions, i.e., resulting in one large partition.) The backup latch protects the information describing backup progress, hence synchronizing backup with the flushing activity of the cache manager. The backup latch protects D and P for a partition.

When the backup process updates backup progress information, it requests the partition backup latch in exclusive mode, represented as optional step 315 in FIG. 7. When granted, backup can update D and P. When updating is complete, backup releases the backup latch, represented as optional step 325 in FIG. 7.

Figure 8:
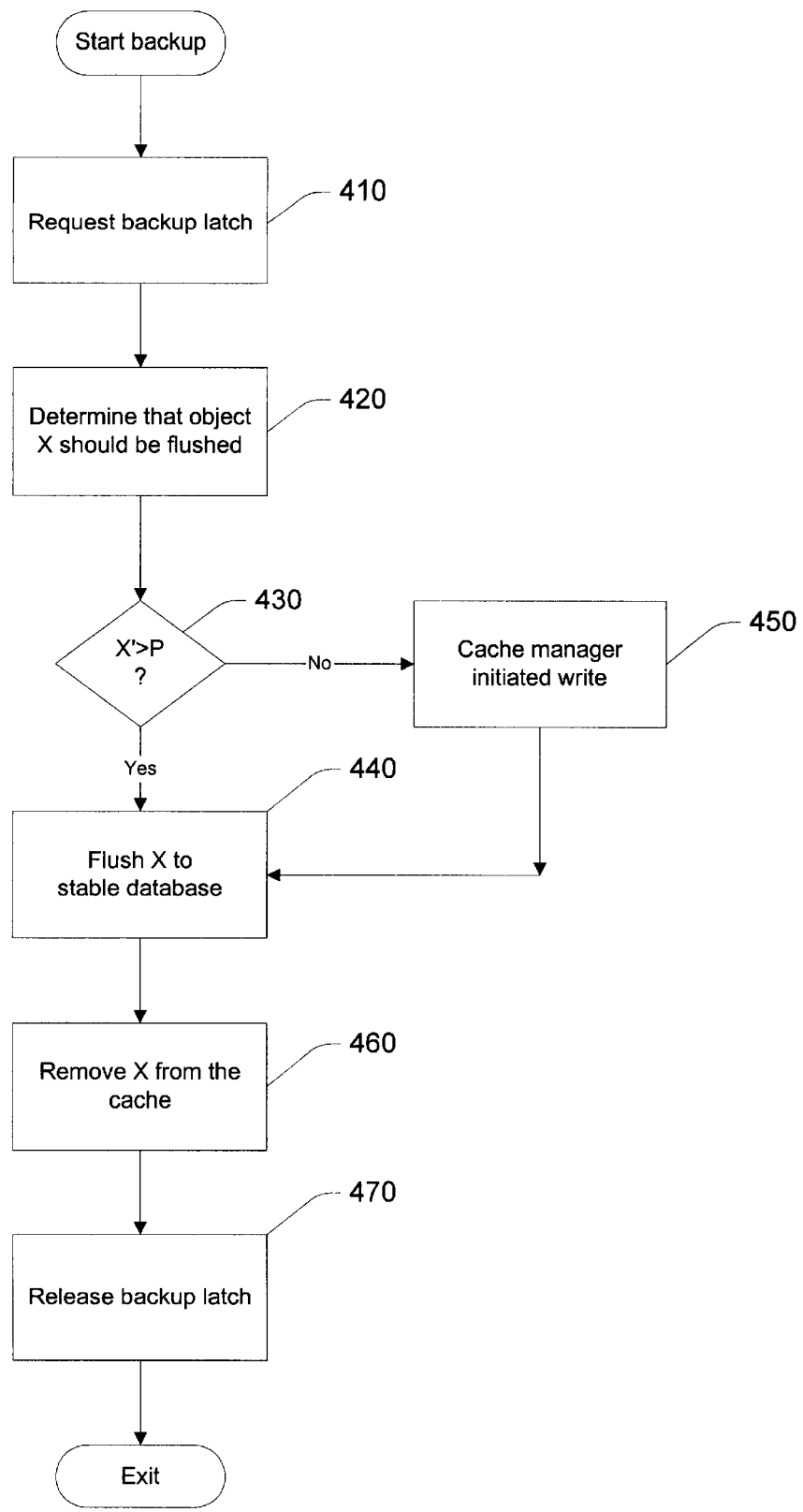
FIG. 8 is a flow chart of another exemplary method of backing up the stable database in accordance with the present invention.

FIG. 8 shows a flowchart for an exemplary method of backing up using a cache manager in accordance with the present invention. When the cache manager processes a write graph node, it requests the backup latch in share mode, at step 410. This prevents backup from changing D and P while the cache manager is flushing objects. Share mode enables a multi-threaded cache manager to flush objects concurrently. At step 410, the backup latch in share mode is requested for the partition containing X where the node n has no write graph predecessors. (Assume that X is the only object in the set, to enforce operation atomicity.)

At step 420, the cache manager determines that object X should be flushed. If X'>P at step 430, and thus is "pending", it is flushed to the stable database at step 440, as in the case when backup is not active. If X'<P, then a cache manager initiated write operation is introduced at step 450, writing X to the log, and hence installing without flushing the operations associated with the write graph node. X may also then be flushed to the stable database at step 440, and the cache manager may remove X from the cache at step 460. Following this process, the cache manager releases the backup latch at step 470.

Backup for Tree Operations

When logical operations are logged, extra cost for writing extra data to the log may be incurred. Tree operations are a restricted class of logical operation that is more general than the class of page-oriented operations. Tree operations permit, for example, the logging of B-tree splits without logging any data records, thereby reducing the amount of data that needs to be logged. Tree operations avoid cyclic dependencies and retain the property of updating only a single page.

Like page-oriented operations, a tree operation can read and write an existing object, but it can also write an object not previously updated (a new object) in the same operation. Page-oriented operations (i.e., "physiological" operations) are included in the tree operation definition. Tree operations are of two forms: "page oriented" and "write-new". Page-oriented can read an existing object "old" and write "old", and write-new can read an existing object "old" and write a new object "new".

Tree operations are useful because a new object can be initialized without logging its initial value. For example, B-tree node split operations (expressed as log tree operations) can be very efficiently logged compared to using page-oriented operations.

When using page-oriented operations, the old page update is logged as RmvRec(old, key) that removes records with keys larger than the key from the old page. The new page update is logged as a physical write where the records needed to initialize the new page are in the log record, i.e., as Write (new, loggedrecords).

When using tree operations, the update of the old page is logged as described above. However, the new page write is logged as MovRec(old, key, new), moving the high records from "old" to "new". For tree operations, MovRec must precede RmvRec because the updated old page will not contain the moved records.

For tree operation write graphs, the only edges are between a new object "new" and an old object "old", for which an operation reads "old" and writes "new". This can produce a "branching" of the write graph. However, no joining of write graph paths, and no cycles requiring a collapse are introduced. This results in a write graph where each node n has one object to be flushed. Hence, as with page-oriented operations, a write graph node can be identified with its updated object. Thus, "new" is a predecessor of "old", and "old" is a successor of "new", in the write graph.

Successors for any object X in the cache are on at most one path of write graph nodes. A successor node may, however, have more than one predecessor as a single old object can spawn edges to multiple new objects. Tree operations are so-named because their write graph is a set of trees.

An old object is considered a potential successor of a new object if there has been an operation that reads the old object and writes the new object, but the old object has not yet been updated. The union of successors and potential successors of a cached object X is denoted by S(X). With only tree operations, additional objects are not added to S(X) for any object in the cache. The set S(X) is fixed at the time that an object is first updated in the cache. Subsequent operations may add predecessors, but not successors because an object can only be a new object the first time it is updated.

It is desirable to identify when to use "installation without flushing" to install operations of node n into the backup database. Recall that the set S(X) for each X is fixed when node n is added to the write graph. The properties of S(X) together with the properties of node n help determine how to install the operations. When the backup reports its progress in several steps, an important determining factor in whether the extra logging of "installation without flushing" is needed when X is flushed is how backup progress compares with the positions of X and its successors, S(X). For this, MAX(X) is determined (the maximum value y' of y in S(X)) and it is stored with each cached object X. When a write new object operation appears that writes X, a new MAX(X) is alculated as the maximum value y' of y in S(X). MAX(X)=0 if X has no successors. AX(X)=max{Y',MAX(Y)} for a new X with Y as its immediate successor. Then (X) is considered "done", "pending", or "in doubt" based on the value of MAX(X). If MAX(X)≦D, then done(S(X)) and no successor y of X will appear in the backup database. Otherwise, when MAX(X)>D, then notdone(S(X)) and some successor y of X might appear in the backup database.

A multi-part analysis is provided for identifying when the extra logging required for installing without flushing can be avoided. The analysis depends on the state of backup progress. The inventors have performed the analysis and the decomposition resulting from this analysis is shown in FIG. 9.

Figure 9:
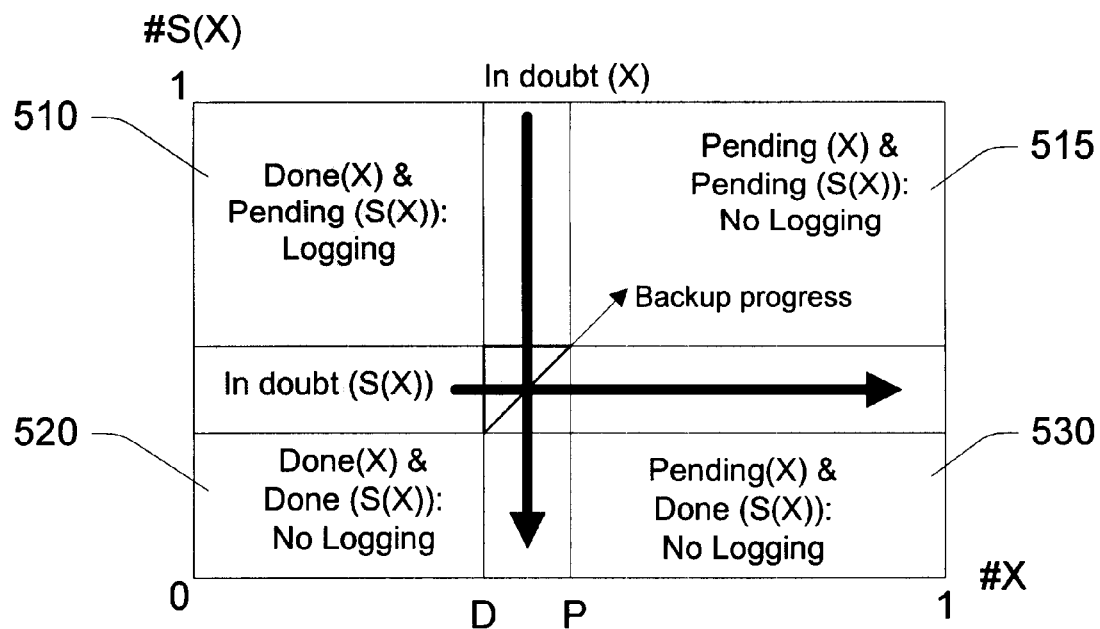
FIG. 9 is a diagram showing the cases involving tree operations in which extra logging is or is not desirable in accordance with the present invention.

In FIG. 9, the regions of <X', S(X)'> space are related to whether or not additional logging is needed to ensure that flush order dependencies of the write graph are enforced for the backup. The area 510 is associated with the case when S(X) is pending and X is done, and thus needs the installation without flushing logging.

No extra logging is used when everything is pending (area 515) or when everything is done (area 520). Furthermore, when X is pending, and S(X) is done (area 530), no extra logging is used. Thus, for pending (X) or done (S(X)), either (1) X will appear in the backup database (pending(X)), or (2) no y in S(X) will be included in the backup database (i.e., done(S(X)), X can be flushed without extra logging because flush order cannot be violated.

For (pending (X) and done(S(X)), region 530, X will get to B and hence flush order is enforced.

In region 510, (done(X) and pending(S(X))), X will not get to the backup but S(X) will. Hence, to guarantee that the operations writing X are installed not later than the operations on S(X), a cache manager initiated write operation is introduced, installing these operations without flushing.

Region 510 includes the "in doubt" regions below and to the left of it. Thus region 510 is indicated by the shaded area of FIG. 9. When S(X) is in doubt, but X is done, X will not be in the backup, but some y in S(X) might be. When X is in doubt, and S(X) is pending, it is not known whether X will be in the backup, but a y in S(X) will be. Both these situations require the logging of a cache manager initiated write operation.

For indoubt (X) and indoubt (S(X)), when X and S(X) both fall into the region that is actively being backed up (in doubt), it is unknown whether they will get to the backup database. In this region, the following property is used. If (any y in S(X) gets to the backup database when flushed to the stable database), then (any earlier flush of X to the stable database gets to the backup database). When this property is valid, the flush order to the backup is not compromised and extra logging is avoided. If X does not get into the backup database, then neither will all of S(X). This property holds when X'<S(X)'.

Consider first the case where there is a single successor to X. X is preferably installed not later than y; i.e., if y is in the backup, X must also be in the backup. This is so when y'<X', where y' is the value of y and X' is the value of X.

If there is an order violation between any pair of successors (i.e., the property does not hold), then installation without flushing must be used for that successor. This ensures that there is a successor to X that is guaranteed to be installed in the backup database. But it is unknown whether X will get to the backup database. Thus, installation without flushing is used to ensure that X will also be installed in the backup database. Once an order violation appears among S(X), any subsequently added predecessors of X also have an order violation and must be installed in the backup database using installation without flushing. Thus, each write graph node n has a violation(n) flag. The flag is set if X'≦y' where y is an immediate successor resulting from an operation in which an operation read y and wrote X or if violation(y) is set. This incrementally maintains violation (X) for all X.

According to another aspect of the present invention, by identifying the portion of the stable database that has changed since the last backup, only the changed portion is backed up. This is called an "incremental backup". Incremental backup proceeds by identifying the set of database objects that have been updated since the last backup. Techniques that do this for page-oriented log operations can be adapted for use with the present invention. The identified objects are then copied to the backup database.

The invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrine.

What is claimed is:

1. In a database computer system having a non-volatile memory including a stable log and a stable database comprising a plurality of objects, a cache manager for flushing objects to the stable database, and a backup database, a computer-implemented method comprising the following steps:

(a) copying objects from a first region of the stable database to the backup database while a first update activity continues, in accordance with at least a first logical log operation, the first region of the stable database bounded by a first boundary value and a second boundary value;

(b) adjusting the first boundary value and adjusting the second boundary value to define a further region of the stable database; and (c) copying objects from the further region of the stable database to the backup database while a second update activity continues, in accordance with at least a second logical log operation.

2. A computer-implemented method as recited in claim 1, further comprising performing steps (b) and (c) until substantially all of the objects of the stable database have been copied to the backup database.

3. A computer-implemented method as recited in claim 1, further comprising performing steps (b) and (c) until the objects of a predetermined portion of the stable database have been copied to the backup database.

4. A computer-implemented method as recited in claim 3, wherein the predetermined portion of the stable database is bounded by a minimum value and a maximum value, the first boundary value initially set to the minimum value.

5. A computer-implemented method as recited in claim 1, wherein adjusting the first boundary value comprises setting the first boundary value equal to the second boundary value and adjusting the second boundary value comprises increasing the second boundary value by a predetermined increment.

6. A computer-implemented method as recited in claim 1, wherein adjusting the first boundary value comprises increasing the first boundary value by a predetermined increment and adjusting the second boundary value comprises increasing the second boundary value by the predetermined increment.

7. A computer-implemented method as recited in claim 1, wherein each object has a value, with the objects being copied in order of increasing value.

8. A computer-implemented method as recited in claim 7, wherein the value of each object is determined from an associated physical location in the stable database.

9. A computer-implemented method as recited in 7, wherein the copying of objects is responsive to a plurality of logical operations that are restricted to tree operations.

10. A computer-implemented method as recited in claim 9, further comprising reducing the copying of the objects updated by the tree operations.

11. A computer-implemented method as recited in claim 1, further comprising the cache manager obtaining a backup latch to prevent the boundary values from being altered when objects are being flushed to the stable database.

12. A computer-implemented method as recited in claim 11, further comprising acquiring the backup latch when adjusting the boundary values, and releasing the backup latch after the boundary values have been changed.

13. A computer-implemented method as recited in claim 1, further comprising posting to the stable log cache manager identity write log operations for objects that are being flushed.

14. A computer-implemented method as recited in claim 13, further comprising establishing flush order dependencies between objects in the stable database and enforcing the dependencies when the objects are copied to the backup database when the flush dependency is violated in the backup.

15. A computer programmed to perform the steps of the computer-implemented method as recited in claim 1.

16. A computer-readable memory that directs a computer to perform the steps in the method as recited in claim 1.

17. A database computer system comprising:
- a non-volatile memory including a stable log and a stable database comprising a plurality of objects;
- a backup database; and
- a resource manager including a cache manager which flushes objects to the stable database, the resource manager being configured to copy objects from a first region of the stable database to the backup database while a first update activity continues, in accordance with at least a first logical log operation, the first region of the stable database bounded by a first boundary value and a second boundary value; adjust the first boundary value and adjust the second boundary value to define a further region of the stable database; and copy objects from the further region of the stable database to the backup database while a second update activity continues, in accordance with at least a second logical log operation.

18. A database system as recited in claim 17, wherein the objects are copied and the boundaries are adjusted until a predetermined portion of the objects of the stable database have been copied to the backup database.

19. A database system as recited in claim 18, wherein the predetermined portion is substantially all of the objects.

20. A database system as recited in claim 18, wherein the predetermined portion of the stable database is bounded by a minimum value and a maximum value, the first boundary value initially set to the minimum value.

21. A database system as recited in claim 17, wherein the first boundary value is adjusted by increasing the first boundary value by a predetermined increment and the second boundary value is adjusted by increasing the second boundary value by the predetermined increment.

22. A database system as recited in claim 17, wherein the first boundary value is adjusted by setting the first boundary value equal to the second boundary value and the second boundary value is adjusted by increasing the second boundary value by a predetermined increment.

23. A database system as recited in claim 17, wherein each object has a value, with the objects being copied in order of increasing value.

24. A database system as recited in claim 23, wherein the value of each object is determined from an associated physical location in the stable database.

25. A database system as recited in claim 17, further comprising a plurality of logical operations that are restricted to tree operations.

26. A database system as recited in claim 17, further comprising a backup latch for preventing the boundary values from being altered when objects are being flushed to the stable database.

27. A database system as recited in claim 17, wherein the stable log includes cache manager identity write log operations for objects that are being flushed.

28. A database system as recited in claim 17, wherein the resource manager establishes flush order dependencies between cached objects of the stable database and enforces the dependencies when the objects are copied to the backup database.

* * * * *